US012737861B2

(12) United States Patent
Huang et al.

(10) Patent No.: US 12,737,861 B2
(45) Date of Patent: Sep. 15, 2026

(54) IMAGE PROCESSING FOR IMPROVING IMAGE QUALITY

(71) Applicant: Black Sesame Technologies (Shenzhen) Co., Ltd., Shenzhen (CN)

(72) Inventors: Lihong Huang, Shanghai (CN); Chao Wang, Shanghai (CN); Donghui Wu, San Mateo, CA (US)

(73) Assignee: Black Sesame Technologies (Shenzhen) Co., Ltd., Shenzhen (CN)

( * ) Notice: Subject to any disclaimer, the term of this patent is extended or adjusted under 35 U.S.C. 154(b) by 124 days.

(21) Appl. No.: 18/491,673

(22) Filed: Oct. 20, 2023

(65) Prior Publication Data

US 2024/0135518 A1 Apr. 25, 2024
US 2024/0233101 A9 Jul. 11, 2024

(30) Foreign Application Priority Data

Oct. 20, 2022 (CN) ......................... 202211289652.2

(51) Int. Cl.
*G06T 5/94* (2024.01)
*G06T 7/90* (2017.01)
(Continued)

(52) U.S. Cl.
CPC .................. *G06T 5/94* (2024.01); *G06T 7/90* (2017.01); *G06T 2207/10024* (2013.01)

(58) Field of Classification Search
CPC ........... G06T 5/94; G06T 7/90; G06T 7/2207; G06T 11/001; G09G 5/02; G09G 5/06;
(Continued)

(56) References Cited

U.S. PATENT DOCUMENTS 7,839,455 B2 11/2010 Harada
9,031,319 B2 5/2015 Cote et al.
(Continued)

FOREIGN PATENT DOCUMENTS

CN 101742339 A 6/2010
CN 108376539 A 8/2018
(Continued)

OTHER PUBLICATIONS eason.blog.csdn.net [online], "Summary of color gamut space," Apr. 10, 2014, retrieved on Oct. 27, 2025, retrieved from URL <https://eason.blog.csdn.net/article/details/23352879?fromshare-blogdetail&sharetype-blogdetail&sharerId=23352879&sharerefer=PC&sharesource=sy568356&sharefrom=from_link>, 10 pages.
(Continued)

*Primary Examiner* — Wesner Sajous
(74) *Attorney, Agent, or Firm* — Fish & Richardson P.C.

(57) ABSTRACT

An image processing method, apparatus, and an electronic device. The method includes: adjusting an original luminance parameter of a pixel point in an image based on a luminance adjustment strategy to obtain an adjusted luminance parameter; determining a luminance change parameter of the pixel point according to the original luminance parameter and the adjusted luminance parameter, where the luminance change parameter is configured to represent a changing degree of the adjusted luminance parameter relative to the original luminance parameter; and adjusting an original saturation parameter of the pixel point based on the luminance change parameter to obtain an adjusted saturation parameter, so as to compensate for a saturation of the pixel point.

20 Claims, 6 Drawing Sheets

(51) Int. Cl.

| | |
|---|---|
| ***G06T 11/00*** | (2026.01) |
| ***G09G 5/02*** | (2006.01) |
| ***H04N 1/60*** | (2006.01) |
| ***H04N 5/57*** | (2006.01) |
| ***H04N 9/69*** | (2023.01) |
| ***H04N 9/73*** | (2023.01) |

(58) Field of Classification Search

CPC ... G09G 2320/0271; G09G 2320/0276; G09G 2320/06; H04N 1/58; H04N 1/60; H04N 1/6019–6027; H04N 5/445; H04N 5/57–58; H04N 9/64–69; H04N 9/73–78

See application file for complete search history.

(56) References Cited

U.S. PATENT DOCUMENTS

| | | | | |
|---|---|---|---|---|
| 10,242,646 B2 | | 3/2019 | Yang | |
| 2015/0373314 A1 | * | 12/2015 | Zhu | H04N 9/646 348/648 |
| 2019/0021580 A1 | * | 1/2019 | Mishima | A61B 1/0638 |
| 2019/0052853 A1 | * | 2/2019 | Yoshida | H04N 9/646 |
| 2019/0287470 A1 | * | 9/2019 | Kobayashi | H04N 9/30 |

FOREIGN PATENT DOCUMENTS

| | | | | |
|---|---|---|---|---|
| CN | 112330564 A | | 2/2021 | |
| CN | 113066020 A | | 7/2021 | |
| CN | 115063314 | | 9/2022 | |
| CN | 112330564 B | * | 8/2023 | G06T 5/90 |
| CN | 113066020 B | * | 7/2024 | G06N 3/08 |
| KR | 20210021852 A | | 3/2021 | |

OTHER PUBLICATIONS

Office Action in Chinese Appln. No. 202211289652.2, mailed on Jul. 5, 2025, 33 pages (with English translation).

* cited by examiner

IMAGE PROCESSING FOR IMPROVING IMAGE QUALITY

CROSS-REFERENCE TO RELATED APPLICATION

This application claims the benefit under 35 U.S.C. § 119(a) of the filing date of Chinese Patent Application No. 202211289652.2, filed in the Chinese Patent Office on Oct. 20, 2022. The disclosure of the foregoing application is herein incorporated by reference in its entirety.

TECHNICAL FIELD

The present specification relates to the technical field of image processing, and in particular, to an image processing method and apparatus, and an electronic device.

BACKGROUND

Due to a limitation of a photographing environment or a photographing device, an image collected by the photographing device in some cases is of poor quality, for example, low luminance, and a general processing method for improving an image quality is to adjust image luminance. However, the image quality of the image may become poor if only the image luminance is increased, and a display effect is reduced.

SUMMARY

In view of this, the described techniques are related to an image processing method and apparatus, and an electronic device, which may adaptively adjust a saturation of a pixel point while adjusting luminance of the pixel point, thereby improving an image quality and obtaining a good display effect.

According to a first aspect, the embodiments of the described techniques provide an image processing method, which includes: adjusting an original luminance parameter of a pixel point in an image based on a luminance adjustment strategy to obtain an adjusted luminance parameter; determining a luminance change parameter of the pixel point according to the original luminance parameter and the adjusted luminance parameter, where the luminance change parameter is configured to represent a changing degree of the adjusted luminance parameter relative to the original luminance parameter; and adjusting an original saturation parameter of the pixel point based on the luminance change parameter to obtain an adjusted saturation parameter, so as to compensate for a saturation of the pixel point.

According to a second aspect, the embodiments of the described techniques provide an image processing method, which includes: determining a saturation parameter point of a pixel point in a first color space, where the first color space is a luminance-chroma color space; determining a hue direction based on the saturation parameter point and a reference point in the first color space when the saturation parameter point exceeds a valid representation range of an RGB color space; determining an RGB parameter of the pixel point in the RGB color space based on an intersection point of the hue direction and an edge of the RGB color space; and converting a saturation parameter of the first color space into an RGB parameter of the RGB color space based on a preset conversion rule when the saturation parameter point is within the valid representation range of the RGB color space.

According to a third aspect, the embodiments of the described techniques provide an image processing apparatus, which includes: a first adjusting module, configured to adjust an original luminance parameter of a pixel point in an image based on a luminance adjustment strategy to obtain an adjusted luminance parameter; a determining module, configured to determine a luminance change parameter of the pixel point according to the original luminance parameter and the adjusted luminance parameter, where the luminance change parameter is configured to represent a changing degree of the adjusted luminance parameter relative to the original luminance parameter; and a second adjusting module, configured to adjust an original saturation parameter of the pixel point based on the luminance change parameter to obtain an adjusted saturation parameter, so as to compensate for a saturation of the pixel point.

According to a fourth aspect, the embodiments of the described techniques provide an image processing apparatus, which includes: a first determining module, configured to determine a saturation parameter point of a pixel point in a first color space, where the first color space is a luminance-chroma color space; a second determining module, configured to determine a hue direction based on the saturation parameter point and a reference point in the first color space when the saturation parameter point exceeds a valid representation range of an RGB color space; a third determining module, configured to determine an RGB parameter of the pixel point in the RGB color space based on an intersection point of the hue direction and an edge of the RGB color space; and a converting module, configured to convert a saturation parameter of the first color space into an RGB parameter of the RGB color space based on a preset conversion rule when the saturation parameter point is within the valid representation range of the RGB color space.

According to a fifth aspect, the embodiments of the described techniques provide an electronic device, which includes: a processor; and a memory configured to store instructions executable by the processor, where the processor is configured to perform the image processing method according to the first or the second aspect.

According to a sixth aspect, the embodiments of the described techniques provide a computer-readable storage medium, where the storage medium stores a computer program, and the computer program is configured to perform the image processing method according to the first or the second aspect.

According to a seventh aspect, the embodiments of the described techniques provide a computer program product, where the computer program product includes instructions, and when the instructions are executed by a processor of a computer device, the computer device is enabled to perform steps in the method according to the foregoing embodiments.

According to an eighth aspect, the embodiments of the described techniques provide a chip, which includes: a processor; and a memory configured to store instructions executable by the processor, where the processor is configured to perform the image processing method according to the first or the second aspect.

Embodiments of the described techniques provide an image processing method and apparatus, and an electronic device, which may compensate for a saturation of a pixel point by adjusting an original saturation parameter of the pixel point according to a luminance change parameter of the pixel point, so that the saturation of the pixel point is adaptively adjusted while adjusting luminance of the pixel point, so as to improve perception of human eye on the saturation of an image, and thus an image quality may be improved, and a good display effect may be obtained.

DETAILED DESCRIPTIONS OF THE EMBODIMENTS

Embodiments of the present application are described below with reference to the accompanying drawings. Embodiments described in this document are not all possible embodiments inherently implied by the described techniques. All techniques derived from techniques described herein fall within the scope of the described techniques.

In an image processing process, in order to improve a display effect of an image, luminance of the image may be adjusted, for example, the luminance of the image is improved or reduced. This processing method only changes a luminance value of the image, however, with a change of the luminance of the image, perception of human eye on a saturation of the image also changes, and especially when the change of the luminance of the image is great, an image quality is reduced if only the luminance value of the image is changed, so that a display effect of the image becomes poor. This is because a color saturation depends on a mixing ratio of a color component and a white component, as the luminance increases, a ratio of the white component increases, which makes the saturation decrease.

Therefore, when processing the image, there is a technical problem of reducing image quality if only the luminance of the image is changed.

In view of above technical problem, the embodiments described techniques provide an image processing method, which adaptively adjusts the saturation of a pixel point while adjusting the luminance of the pixel point, so that the image quality may be improved, and a good display effect may be obtained.

Exemplary System

Figure 1:
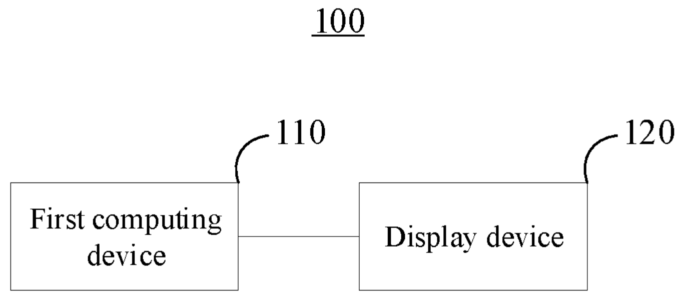
FIG. 1 is a schematic diagram of a system architecture of an image processing system according to an exemplary embodiment of the described techniques.

FIG. 1 is a schematic diagram of a system architecture of an image processing system 100 according to an exemplary embodiment described techniques, as shown in FIG. 1, the system 100 includes a computing device 110 and a display device 120, where the computing device 110 may be in communication connection with the display device 120.

The computing device 110 may be a vehicle-mounted device, a server (such as a cloud server, a server cluster), a personal computer, a mobile terminal, a personal digital assistant, and other devices.

The computing device 110 may adjust a luminance parameter of a pixel point of an image based on a luminance adjustment strategy to obtain an adjusted luminance parameter, and adjust a saturation parameter of the pixel point according to a luminance changing degree of the pixel point to obtain an adjusted saturation parameter. The computing device 110 may send the adjusted luminance parameter and the adjusted saturation parameter of each pixel point of the image to the display device 120, and the display device 120 displays the image based on the adjusted luminance parameter and the adjusted saturation parameter.

Optionally, the computing device 110 may process the luminance parameter and the saturation parameter of the pixel point through a first color space, that is, the luminance parameter and the saturation parameter may be parameters in the first color space. The display device 120 may convert the adjusted luminance parameter and the adjusted saturation parameter in the first color space into a color parameter in a second color space, and display the image based on the color parameter in the second color space. Alternatively, the computing device 110 may convert the adjusted luminance parameter and the adjusted saturation parameter in the first color space into the color parameter in the second color space, and send the color parameter in the second color space to the display device 120, and the display device 120 displays the image based on the color parameter in the second color space.

Specifically, the first color space may be a Luma-Chroma color space (luminance-chroma color space), an HSV (Hue Saturation Value) color space, an HLS (Hue Lightness Saturation) or other color spaces; the second color space may be an RGB color space, and the color parameter may be an RGB parameter. The Luma-Chroma color space may be a YCrCb color space or a YUV color space.

It should be understood that the computing device 110 and the display device 120 may be two mutually independent devices, or integrated on a same device.

It should be noted that the above-mentioned application is merely shown in order to facilitate understanding of the described techniques, and the embodiments described in this document are not limited thereto. In contrast, embodiments described in this document may be applied to any scenario that may be applicable.

Exemplary Method

Figure 2:
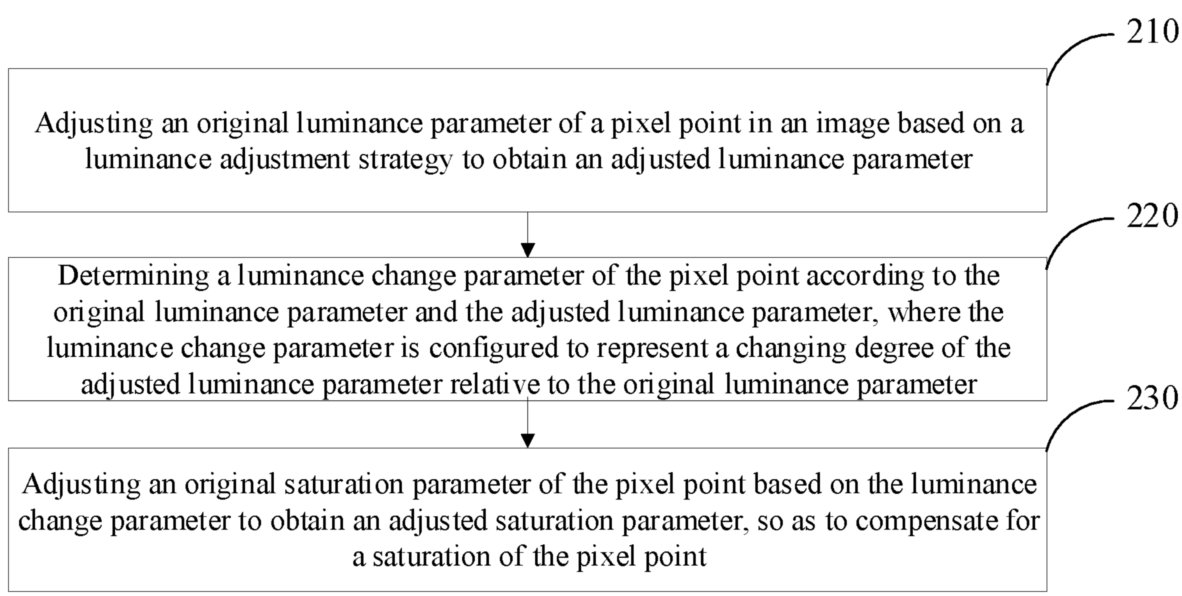
FIG. 2 is a schematic flowchart of an image processing method according to an exemplary embodiment of the described techniques.

FIG. 2 is a schematic flowchart of an image processing method according to an exemplary embodiment of the described techniques. The method of FIG. 2 may be performed by a computing device (for example, the computing device 110 in FIG. 1). As shown in FIG. 2, the image processing method includes the following content.

Step 210: adjusting an original luminance parameter of a pixel point in an image based on a luminance adjustment strategy to obtain an adjusted luminance parameter.

Specifically, the luminance adjustment strategy may be preset, for example, for an original image, a luminance parameter of each pixel point in the original image needs to be adjusted may be preset; or, whether the luminance parameter of each pixel point in the original image satisfies a preset condition is determined, and if not, the luminance parameter of the pixel point is adjusted to a preset luminance parameter, and if yes, the luminance parameter of the pixel point is maintained unchanged. According to the luminance adjustment strategy, the adjusted luminance parameter of the pixel point may be equal to, less than or greater than the original luminance parameter.

Step 220: determining a luminance change parameter of the pixel point according to the original luminance parameter and the adjusted luminance parameter, where the luminance change parameter is configured to represent a changing degree of the adjusted luminance parameter relative to the original luminance parameter.

For example, the luminance change parameter may be a luminance gain and/or a luminance variation. The luminance gain is a ratio of the adjusted luminance parameter to the original luminance parameter; and the luminance variation is a difference between the adjusted luminance parameter and the original luminance parameter.

Optionally, the luminance change parameter may be determined by a certain function, and the luminance change parameter may be obtained by substituting the original luminance parameter and the adjusted luminance parameter into the function. For example, the function may be $L3=a*L2-b*L1$, where L3 is the luminance change parameter, L2 is the adjusted luminance parameter, L1 is the original luminance parameter, a and b are coefficients, and a and b may be set according to actual requirements.

Step 230: adjusting an original saturation parameter of the pixel point based on the luminance change parameter to obtain an adjusted saturation parameter, so as to compensate for a saturation of the pixel point.

Specifically, a saturation parameter may be a parameter for representing or determining saturation. For example, in a YCrCb color space, Y is the luminance parameter for describing the luminance of a pixel; and Cr and Cb are chroma parameters for describing a hue and saturation of the pixel. The saturation S may be obtained by the following formula (1).

$$S=\sqrt{(Cb-128)^2+(Cr-128)^2} \tag{1}$$

Since in the YCrCb color space, the saturation S is obtained based on hue parameters Cr and Cb, the hue parameters Cr and Cb may also be referred to as saturation parameters. The original saturation parameter may be expressed as Cr1 and Cb1, and the adjusted saturation parameter Cr2 and Cb2 may be obtained by adjusting Cr1 and Cb1, and optionally, in other scenarios, the saturation parameter may be S.

For another example, in an HSV color space, H is a hue parameter, S is a saturation parameter, and V is a luminance parameter. In the color space, the original saturation parameter may be expressed as S1, and the adjusted saturation parameter S2 may be obtained by adjusting S1.

In other color spaces, the definition of the saturation parameter may refer to the definitions of the saturation parameter in above two color spaces, and details are not described herein again.

The image may be presented based on the adjusted saturation parameter and adjusted luminance parameter of each pixel point. For example, the computing device may display the image based on the adjusted saturation parameter and the adjusted luminance parameter of each pixel point, or the computing device sends the adjusted saturation parameter and the adjusted luminance parameter of each pixel point to a display device, so that the display device displays the image.

According to the image processing method provided in the embodiments of the described techniques, the saturation of the pixel point may be compensated by adjusting the original saturation parameter of the pixel point according to the luminance change parameter of the pixel point, so that the saturation of the pixel point is adaptively adjusted while adjusting the luminance of the pixel point, so as to improve perception of human eye on the saturation of the image, and thus the image quality may be improved, and a good display effect may be obtained.

According to an embodiment of the described techniques, the adjusting an original saturation parameter of the pixel point based on the luminance change parameter to obtain an adjusted saturation parameter, includes: determining a saturation gain parameter based on the luminance change parameter; and determining the adjusted saturation parameter based on the saturation gain parameter and the original saturation parameter.

Specifically, the luminance change parameter may include the luminance gain and/or the luminance variation, and the saturation gain parameter may be represented as Gain.

For example, in the YCrCb color space, formulas (2a) and (2b) for determining the adjusted saturation parameter (Cr2 and Cb2) based on the saturation gain parameter Gain and the original saturation parameter (Cr1 and Cb1) are as follows.

$$Cb2=(Cb1-128)*Gain \tag{2a}$$

$$Cr2=(Cr1-128)*Gain \tag{2b}$$

It should be noted here that a range of an 8-bit RGB parameter is 0~255, a range of a corresponding Y parameter is 0~255, and a range of a CrCb parameter is −128~127. The range of Cr and Cb are generally adjusted to a natural number range for ease of data processing (calculation and signal transmission), and therefore, when real Cr and Cb parameters are obtained, the Cr/Cb needs to be subtracted 128 to obtain the real Cr/Cb. In the foregoing formulas, the original saturation parameter (Cr1 and Cb1) is generated during a data processing process, and the adjusted saturation parameter (Cr2 and Cb2) is the real Cr and Cb parameter. It should be understood that if the original saturation parameter is the real Cr and Cb parameter, the adjusted saturation parameter may be determined directly based on a product of the original saturation parameter and the saturation gain parameter Gain.

For another example, in the HSV color space, a formula (2c) for determining the adjusted saturation parameter S2 based on the saturation gain parameter Gain and the original saturation parameter S1 is as follows.

$$S2 = S1 * Gain \tag{2c}$$

In other color spaces, a formula for determining the adjusted saturation parameter may be similar to the above formulas (2a) to (2c), and details are not described herein again.

Optionally, in other examples, a saturation increment parameter may be determined based on the luminance change parameter, and then the adjusted saturation parameter is determined based on the saturation increment parameter and the original saturation parameter.

In this embodiment, the saturation gain parameter is determined based on the luminance change parameter, and then the adjusted saturation parameter is determined based on the saturation gain parameter, so that the saturation of the pixel point can be flexibly adjusted, a degree of saturation change is effectively controlled, and a fine adjustment of the saturation parameter is realized.

According to an embodiment of the described techniques, the luminance change parameter includes a luminance gain, and the determining a saturation gain parameter based on the luminance change parameter, includes: determining a first gain parameter based on the luminance gain, where the first gain parameter is equal to the luminance gain when the luminance gain is greater than or equal to a first threshold, and the first gain parameter is a first constant when the luminance gain is less than the first threshold. The first gain parameter may be the saturation gain parameter.

For specific contents of the luminance gain, reference may be made to the description in the foregoing embodiments.

Specifically, when the adjusted luminance parameter of the pixel point is greater than the original luminance parameter, a saturation of the pixel point should be appropriately increased, so that a problem of poor display effect of the image caused by only increasing luminance of the pixel point may be avoided. For example, when the luminance gain is greater than or equal to the first threshold, the first gain parameter may gradually increase with a gradually increase of the luminance gain. The first threshold may be set according to actual needs, such as 1, 1.1, 1.2, 1.3, and so on.

The original saturation of the pixel point may remain unchanged when the adjusted luminance parameter of the pixel point is less than the original luminance parameter, that is, the saturation is not adjusted, so as to maintain a good image display effect, for example, the first gain parameter is 1. In other examples, the first gain parameter may be 0.99, 0.98, and so on, so as to slightly adjust the saturation and avoid a large influence on an image display effect due to an adjustment of the saturation.

In an example, the first gain parameter gain1 may be determined by the following formula (3), where Y2 is the adjusted luminance parameter, and Y1 is the original luminance parameter.

$$\text{gain1} = \begin{cases} \frac{Y2}{Y1} & \text{if } Y2 \geq Y1 \\ 1 & \text{if } Y2 < Y1 \end{cases} \tag{3}$$

In this example, the first threshold is 1, and the first gain parameter gain1 is equal to the luminance gain when the luminance gain is greater than or equal to the first threshold; and the first gain parameter gain1 is the first constant 1 when the luminance gain is less than the first threshold.

Optionally, the luminance change parameter includes a luminance variation, and the determining a saturation gain parameter based on the luminance change parameter, includes: determining a second gain parameter based on the luminance variation, where the second gain parameter is a second constant when the luminance variation is greater than or equal to the second threshold, and the second gain parameter increases with an increase of the luminance variation when the luminance variation is greater than or equal to 0 and less than the second threshold. The second gain parameter may be the saturation gain parameter.

Specifically, the luminance variation is a difference between the adjusted luminance parameter and the original luminance parameter.

For example, the luminance variation is the difference $\Delta Y$ between the adjusted luminance parameter and the original luminance parameter, $\Delta Y = Y2 - Y1$, where Y2 is the adjusted luminance parameter, and Y1 is the original luminance parameter.

When the adjusted luminance parameter of the pixel point is greater than the original luminance parameter, the saturation of the pixel point should be appropriately increased, so that a problem of poor display effect of the image caused by only increasing the luminance of the pixel point may be avoided. For example, the second gain parameter increases with an increase of the luminance variation. But the second gain parameter may be maintained at a stable value with an increase of the luminance variation to ensure the display effect of the image when the luminance variation reaches a certain degree, for example, greater than or equal to the second threshold, that is, the second gain parameter may be the second constant.

In an example, the second gain parameter gain2 may be determined by the following formula (4).

$$\text{gain2} = \begin{cases} \text{Max2} & \text{if } \Delta Y \geq th2 \\ 1 + K2 * \Delta Y & \text{if } 0 \leq \Delta Y < th2 \\ 1 & \text{if } \Delta Y < 0 \end{cases} \tag{4}$$

In this example, the second threshold is th2, and the second gain parameter gain2 is the second constant Max2 when the luminance variation is greater than or equal to the second threshold; the second gain parameter gain2 increases with the increase of the luminance variation when the luminance variation is greater than or equal to 0 and less than the second threshold, where K2 is a coefficient, which may be set according to actual needs; and the second gain parameter gain2 is 1 when the luminance variation is less than 0, that is, the saturation may not be adjusted.

Optionally, the luminance change parameter includes a luminance gain and a luminance variation, and the determining a saturation gain parameter based on the luminance change parameter, includes: determining a first gain parameter based on the luminance gain, where the first gain parameter is equal to the luminance gain when the luminance gain is greater than or equal to a first threshold, and the first gain parameter is a first constant when the luminance gain is less than the first threshold; determining a second gain parameter based on the luminance variation, where the second gain parameter is a second constant when the luminance variation is greater than or equal to the second threshold, and the second gain parameter increases with an increase of the luminance variation when the luminance variation is greater than or equal to 0 and less than the second threshold; and determining the saturation gain parameter based on the first gain parameter and the second gain parameter.

For specific contents of the luminance gain and the luminance variation, reference may be made to the description in the foregoing embodiments.

In this embodiment, the first gain parameter is obtained based on the luminance gain, the second gain parameter is obtained based on the luminance variation, and the saturation gain parameter is obtained by combining the first gain parameter and the second gain parameter, so that the gains from two perspectives may be integrated to obtain a relatively reasonable saturation gain parameter.

In an example, the specific process of obtaining the first gain parameter gain1 based on the luminance gain may refer to the description in the embodiment of the formula (3) above, the specific process of obtaining the second gain parameter gain2 based on the luminance variation ΔY may refer to the description in the embodiment of the formula (4) above, and details are not described herein again.

In this example, th2, Max2, and K2 may be valued according to actual needs. In some scenarios, a value of th2 may be greater than 0 and less than or equal to 255, for example, 64. A value of Max2 may be 2, 3, 4, and so on., and preferably, may be 2. A value range of gain2 is [1, 2] when the value of Max2 is 2.

The luminance gain reflects a multiple of a luminance change, and if the saturation is compensated only according to the multiple of the luminance change, it is difficult to distinguish the saturation gain parameters corresponding to the pixel points with different original luminance parameters and the same luminance gain, that is, an influence of a difference value of the luminance change on the saturation adjustment process is ignored.

Therefore, the first gain parameter corresponding to the pixel point with a large luminance variation needs to be amplified when the luminance gain is the same, so that a saturation adjustment requirement of the human eye on the pixel point may be better met, and a display effect of the pixel point is improved. In an example, the saturation gain parameter may be determined based on a product of the first gain parameter and the second gain parameter.

For example, the original luminance parameter of a first pixel point is 10, the adjusted luminance parameter of the first pixel point is 20, the first gain parameter gain1 corresponding to the first pixel point is 2, and the luminance variation ΔY is 10. The original luminance parameter of a second pixel point is 100, the adjusted luminance parameter of the second pixel point is 200, the first gain parameter gain1 corresponding to the second pixel point is 2, and the luminance variation ΔY is 100. Assuming that a value of the second threshold th2 is 100, a value of K2 is 0.01, and a value of Max2 is 2, so that the second gain parameter gain2 corresponding to the first pixel point is 1.1, the saturation gain parameter corresponding to the first pixel point may be gain1*gain2=2.2, the second gain parameter gain2 corresponding to the second pixel point is 2, and the saturation gain parameter corresponding to the second pixel point may be gain1*gain2=4. It can be seen that the first gain parameters of the first pixel point and the second pixel point are the same, however, since the difference between the original luminance parameters of the two is large, the difference between the second gain parameters corresponding to the two is also large. Therefore, by combining the first gain parameter and the second gain parameter, the saturation gain parameters of the first pixel point and the second pixel point may be distinguished to respectively implement adaptive adjustment of the saturation of the first pixel point and the saturation of the second pixel point.

In this embodiment, the first gain parameter and the second gain parameter may be complementary to each other. The saturation gain parameter is obtained based on the first gain parameter and the second gain parameter, so that a relatively reasonable saturation gain parameter may be obtained by integrating the gains from two perspectives, thereby obtaining a good display effect.

Optionally, in other examples, the saturation gain parameter may be determined directly based on the luminance gain and the luminance variation, for example, the saturation gain parameter may be obtained by substituting the luminance gain and the luminance variation into a preset function or a neural network model.

According to an embodiment of the described techniques, the image processing method further includes: determining a saturation protection weight based on the original saturation parameter, where the adjusting an original saturation parameter of the pixel point based on the luminance change parameter to obtain an adjusted saturation parameter, includes: determining the saturation gain parameter based on the luminance change parameter; and determining the adjusted saturation parameter based on the saturation gain parameter, the saturation protection weight and the original saturation parameter, where the saturation protection weight is configured to correct the saturation gain parameter.

Specifically, visual color difference of a low-saturation region in the image is generally greater than that of a high-saturation region, for example, a visual difference generated by an original low-saturation region is greater than a visual difference generated by an original high-saturation region when the saturation variation is the same. Therefore, for the low-saturation region, the saturation gain parameter may be appropriately reduced or the saturation may remain unchanged, so as to reduce the visual color difference.

For example, the low-saturation region may be a neutral-colored region, such as a background region in the image, a sky region in the image, a pure white region, a pure gray region, or the like. In one case, if the low-saturation region has noise, such as with a little another color, if saturation enhancement is directly performed on the region, this defect may be exposed, that is, the noise of the region may be more obvious. For example, there is a red dot in the pure white region, and the red dot is not obvious in the entire pure white region when the saturation enhancement is not performed. However, after the saturation enhancement is performed, the red dot (noise) is obvious in the entire pure white region, which affects a visual effect of the entire image. Therefore, in this embodiment, the saturation gain parameter is corrected (constrained) based on the original saturation parameter, so that the visual effect of the image after saturation adjustment may be improved.

For example, when the saturation gain parameter is gain1, a corrected saturation gain parameter may be determined based on a product of the gain1 and the saturation protection weight, and the adjusted saturation parameter may be determined based on a product of the corrected saturation gain parameter and the original saturation parameter; and when the saturation gain parameter is gain2, a corrected saturation gain parameter may be determined based on a product of the gain2 and the saturation protection weight, and the adjusted saturation parameter may be determined based on a product of the corrected saturation gain parameter and the original saturation parameter. Here, the saturation protection weight plays a role in constraining the saturation gain parameter.

In this embodiment, by determining the saturation protection weight based on the original saturation parameter, the saturation gain parameter may be corrected, the saturation gain parameter of the low-saturation region is reduced, and the display effect of the image is improved.

Optionally, the image processing method further includes: determining a saturation protection weight based on the original saturation parameter, where the determining the saturation gain parameter based on the first gain parameter and the second gain parameter, includes: determining the saturation gain parameter based on the first gain parameter, the second gain parameter, and the saturation protection weight, where the saturation protection weight is configured to correct the first gain parameter and the second gain parameter.

For example, the saturation gain parameter may be determined based on a product of the first gain parameter gain1, the second gain parameter gain2, and the saturation protection weight.

As another example, the saturation gain parameter Gain may be determined by the following formula (5), and Sgain is the saturation protection weight.

$$Gain = (gain1 * gain2 - 1) * Sgain + 1 \tag{5}$$

A value range of the saturation protection weight Sgain may be [0, 1], a value of Sgain may be 0 when the original saturation of the pixel point is low, and the value of Sgain may be 1 when the original saturation of the pixel point is high. A value of Gain may be greater than or equal to 1.

For example, the determining a saturation protection weight based on the original saturation parameter includes: determining an original saturation value based on the original saturation parameter; determining that the saturation protection weight is equal to 1 when the original saturation value is greater than a third threshold; determining the saturation protection weight based on a preset coefficient and the original saturation value when the original saturation value is less than or equal to the third threshold and greater than or equal to a fourth threshold, where the fourth threshold is less than the third threshold, and the saturation protection weight is less than or equal to 1; and determining that the saturation protection weight is equal to 0 when the original saturation value is less than the fourth threshold.

Specifically, in the YCrCb color space, the original saturation parameter includes Cr and Cb, and the original saturation value may be determined based on Cr and Cb. In the HSV color space, the original saturation parameter is S, and the original saturation value may be directly determined as the value of S. The saturation protection weight may be equal to 0 when the original saturation value is less than a certain value (the fourth threshold), so that the problem of defect exposure caused by saturation enhancement performed on the pixel point may be avoided. Moreover, since the original saturation is relatively low, the display effect may not be greatly influenced even if the saturation enhancement is not performed on the pixel point. The saturation protection weight may be equal to 1 when the original saturation value is greater than a certain value (the third threshold), that is, the saturation gain parameter is not limited (attenuated). The saturation protection weight may gradually increase with the increase of the original saturation value when the original saturation value is between the fourth threshold and the third threshold, so as to gradually reduce a suppression effect on the saturation gain parameter.

In an example, the saturation protection weight Sgain may be determined by the following formula (6).

$$Sgain = \begin{cases} 0 & \text{if } S < SatTH1 \\ 1 & \text{if } S > SatTH2 \\ K3 * (S - SatTH1) & \text{if } SatTH1 \le S \le SatTH2 \end{cases} \tag{6}$$

In this example, the third threshold is SatTH2, the fourth threshold is SatTH1, K3 is a coefficient set according to actual needs, and S is the original saturation value. In the embodiments of the described techniques, the saturation protection weight Sgain may play a constraint role, for example, may be used to constrain the size of the product of gain1 and gain2.

Specifically, the Sgain may constrain a gain increment (gain1*gain2−1). For example, the product of gain1 and gain2 is 1.1. In one case, the value of Sgain is 1, and the saturation gain parameter Gain is as follows:

$$Gain = (gain1 * gain2 - 1) * 1 + 1 = (1.1 - 1) * 1 + 1 = 0.1 + 1 = 1.1$$

In another case, the value of Sgain is 0.1, and the saturation gain parameter Gain is as follows:

$$Gain = (gain1 * gain2 - 1) * 0.1 + 1 = (1.1 - 1) * 0.1 + 1 = (0.01 + 1) = 1.01$$

It can be seen from the foregoing two cases that the value of Sgain is different according to different original saturation values. Constraints with different degrees may be performed on the increment of the gain by means of the Sgain, so that the saturation gain parameter corresponding to the low-saturation region may be attenuated, and the defect of the low-saturation region may be avoided from being exposed, so as to ensure that the image has a good visual effect.

According to an embodiment of the described techniques, the determining a saturation protection weight based on the original saturation parameter, includes: determining an original saturation value based on the original saturation parameter, and determining the saturation protection weight based on the original saturation value. Specifically, the original saturation value may be determined based on any of following formulas, where S is the original saturation value, and Cr and Cb are the original saturation parameter.

$$S = (|Cb - 128| + |Cr - 128|)/2 \tag{7}$$

$$S = ||Cb - 128| - |Cr - 128|| \tag{8}$$

The image processing method in the embodiment is performed based on the YCrCb color space, and the saturation value may be determined based on Cr and Cb parameters. In the embodiments of the described techniques, the original saturation value may be determined by formulas (1)/(7)/(8).

Formulas (7) and (8) are deformations of the above formula (1). By using the formula (7)/(8) instead of the formula (1) to calculate the original saturation value, a process of opening a root number can be omitted, thereby simplifying a calculation process and improving a calculation efficiency. In addition, there is little difference between the original saturation value determined according to the formula (7)/(8) and the original saturation value determined according to the formula (1), and an approximation is high, so that actual application requirements may be met, a relatively reasonable saturation protection weight is ensured, and the good image display effect is further ensured.

According to an embodiment of the described techniques, the image processing method further includes: obtaining an RGB parameter of the pixel point based on the adjusted luminance parameter and the adjusted saturation parameter; and presenting the image based on the RGB parameter.

Specifically, since the calculation efficiency of the RGB parameter in image processing is not high, the RGB parameter of the original image is generally converted into a parameter in other color spaces (referring to various color spaces above-mentioned, such as the YCrCb color space) for processing during the image processing. The adjusted luminance parameter and the adjusted saturation parameter determined in other color spaces may be converted into the RGB parameter of the RGB color space, and the image may be displayed on the basis of the RGB parameter. The computing device may perform acquisition of the RGB parameter and display of the image, or the computing device sends the adjusted luminance parameter and the adjusted saturation parameter to a display device, and the display device performs acquisition of the RGB parameter and display of the image, or the computing device may obtain the RGB parameter and send the RGB parameter to the display device, and the display device performs display of the image.

However, when converting from the other color space to the RGB color space, a combination of the luminance parameter and the saturation parameter does not necessarily generate a valid RGB parameter.

According to an embodiment of the described techniques, the obtaining an RGB parameter of the pixel point based on the adjusted luminance parameter and the adjusted saturation parameter, includes: determining a saturation parameter point of the pixel point in a current color space based on the adjusted luminance parameter and the adjusted saturation parameter; determining a hue direction based on the saturation parameter point and a reference point in the current color space when the saturation parameter point exceeds a valid representation range of an RGB color space; determining the RGB parameter of the pixel point in the RGB color space based on an intersection point of the hue direction and an edge of the RGB color space; and converting a saturation parameter of the current color space into the RGB parameter of the RGB color space based on a preset conversion rule when the saturation parameter point is within the valid representation range of the RGB color space.

Figure 3:
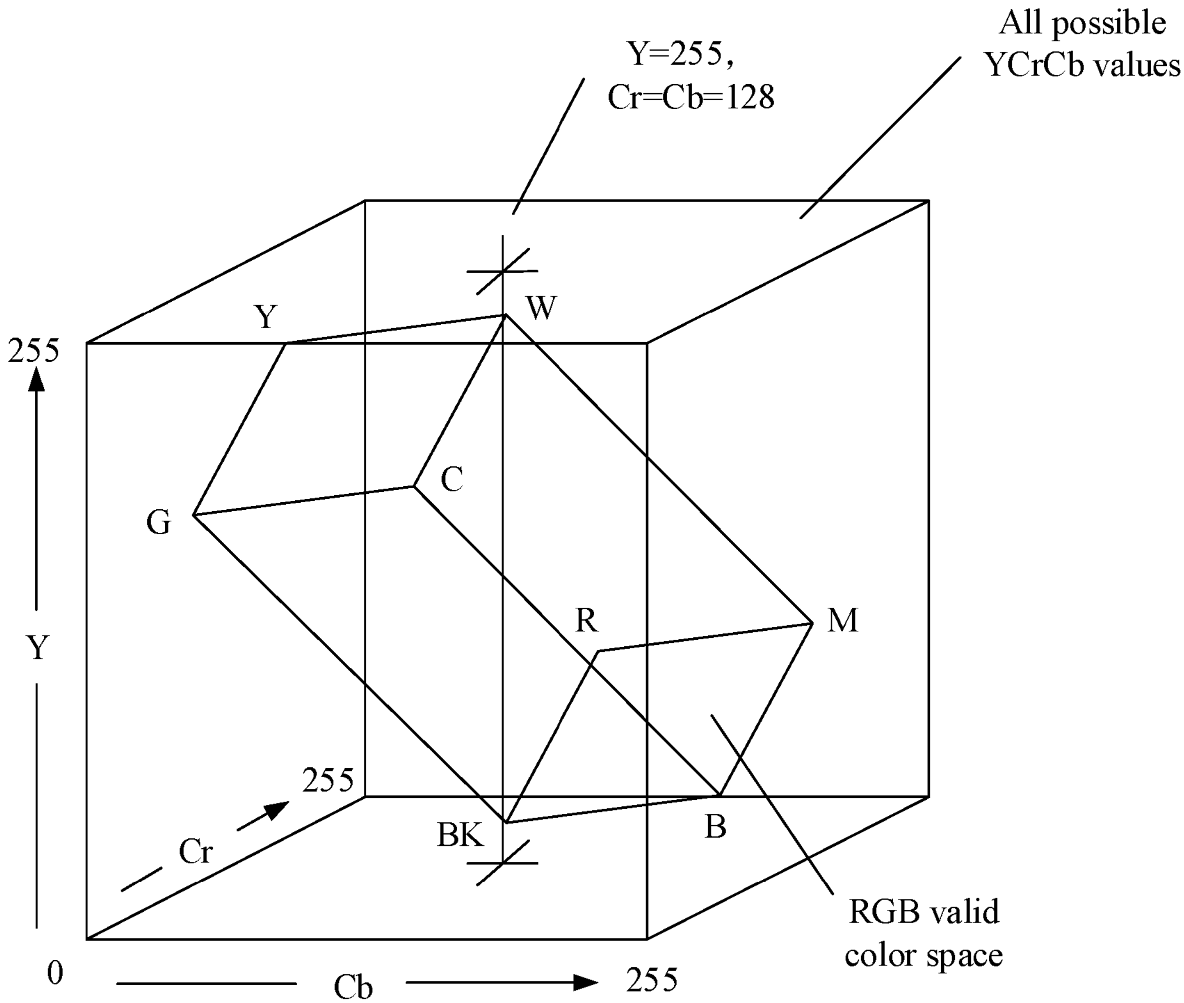
FIG. 3 is a schematic diagram of a three-dimensional YCrCb color space and an RGB color space according to an exemplary embodiment.
Figure 4:
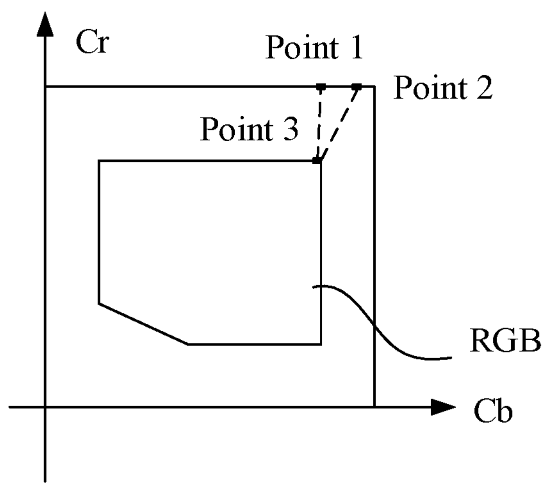
FIG. 4 is a schematic diagram of obtaining an RGB parameter based on a YCrCb parameter according to an exemplary embodiment.

Specifically, the current color space may be a luminance-chroma color space, for example, may be a YCrCb or YUV color space, taking a YCrCb color space as an example, when YCrCb data is converted into the RGB color space, a combination of Y, Cr, and Cb does not necessarily generate a valid RGB parameter. As shown in FIG. 3, a combination of Y, Cr and Cb located in an inner cuboid may generate a valid RGB value, and therefore, the inner cuboid may be regarded as an RGB valid color space. Many combinations of Y, Cr and Cb located outside the inner cuboid may result in invalid RGB values (colors represented by vertices of the inner cuboid: R—Red; G—Green; B—Blue; Y—Yellow; C—Cyan; M—Magenta; W—White; and BK—Black). For example, the RGB parameter ranges from 0 to 255, and an RGB parameter obtained by a conversion of a combination of some Y, Cr and Cb is greater than 255, such as 260, that is, an invalid RGB value. A general method is to directly clip 260 to 255, that is, to clip to a valid range. This method may lose some detail information, and when this method is used for a single RGB channel, a hue error may be introduced. FIG. 4 shows a schematic diagram of obtaining an RGB parameter by this method. As shown in FIG. 4, in a two-dimensional CrCb space, a middle polygon region is a valid RGB color space, and for pixel points (points 1 and 2) in the two-dimensional CrCb space, when the pixel points are converted into RGB parameters, since the RGB parameters converted by point 1 and point 2 all exceed a valid RGB parameter range, a conversion result needs to be clipped to obtain a valid RGB value, and the point 1 and point 2 are clipped to the point 3 finally. However, point 1 and point 2 have different colors, and point 1 and point 2 have the same color (corresponding to an RGB parameter at point 3) after the conversion, therefore, color difference is easy to occur when using this method to perform color space conversion on the parameters.

In the embodiments of the described techniques, the YCrCb data is converted into parameters in the RGB color space under a condition of constant luminance and constant hue, so that data originally exceeding the RGB parameter range may be converted into a relatively reasonable RGB parameter.

Figure 5:
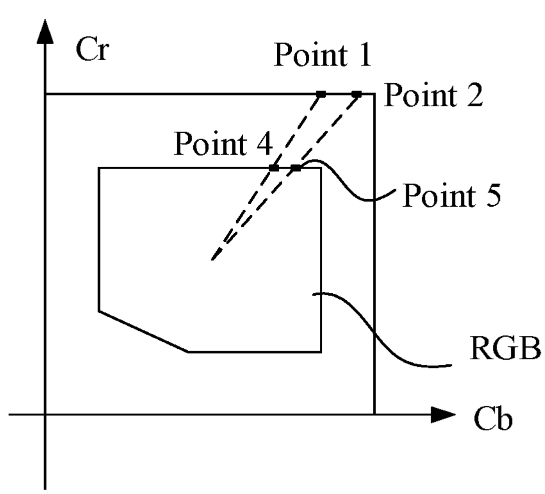
FIG. 5 is a schematic diagram of obtaining an RGB parameter based on a YCrCb parameter according to an exemplary embodiment of the described techniques.

For example, the adjusted luminance parameter may be used as the constant luminance, that is, Y is fixed, so that a determined two-dimensional CrCb space may be obtained, as shown in FIG. 5. In this two-dimensional CrCb space, a corresponding position (saturation parameter point) of an adjusted saturation parameter (that is, Cr and Cb, since the saturation S may be determined based on Cr and Cb, a saturation parameter in some scenarios in the embodiments of the described techniques may be Cr and Cb parameters) may be determined. Two saturation parameter points (points 1 and 2) exceeding an RGB parameter range are shown in FIG. 5. A reference point may be a point with coordinates (128, 128) in the two-dimensional CrCb space, and an RGB value corresponding to the point is (0, 0, 0). A direction extending outward from the reference point is a constant hue direction. A connecting line is obtained if the point 1 is connected to the reference point, the connecting line represents a constant hue direction, an intersection point of the connecting line and an edge of the RGB color space is a point 4, and an RGB parameter corresponding to the point 4 may be used as the RGB parameter converted from the point 1. Similarly, another connecting line is obtained if the point 2 is connected to the reference point, the another connecting line represents another constant hue direction, an intersection point of the another connecting line and the edge of the RGB color space is a point 5, and an RGB parameter corresponding to the point 5 may be used as the RGB parameter converted from the point 2.

It can be seen from FIG. 5 that different RGB parameters (points 4 and 5) may be obtained after points 1 and 2 having different colors are processed by the method of the embodiments of the described techniques, thereby reducing data merging, and enabling the data to be more distributed in a valid data range. Therefore, for the saturation parameter exceeding the RGB parameter range, a relatively reasonable RGB parameter may be obtained by the method according to the embodiments of the described techniques, and detail information of the saturation parameter may be fully utilized to effectively reduce color difference.

For the saturation parameter point within a valid representation range of the RGB color space, a saturation parameter of a current color space may be converted into the RGB parameter of the RGB color space based on a preset conversion rule (such as a general color space conversion rule).

Figure 6:
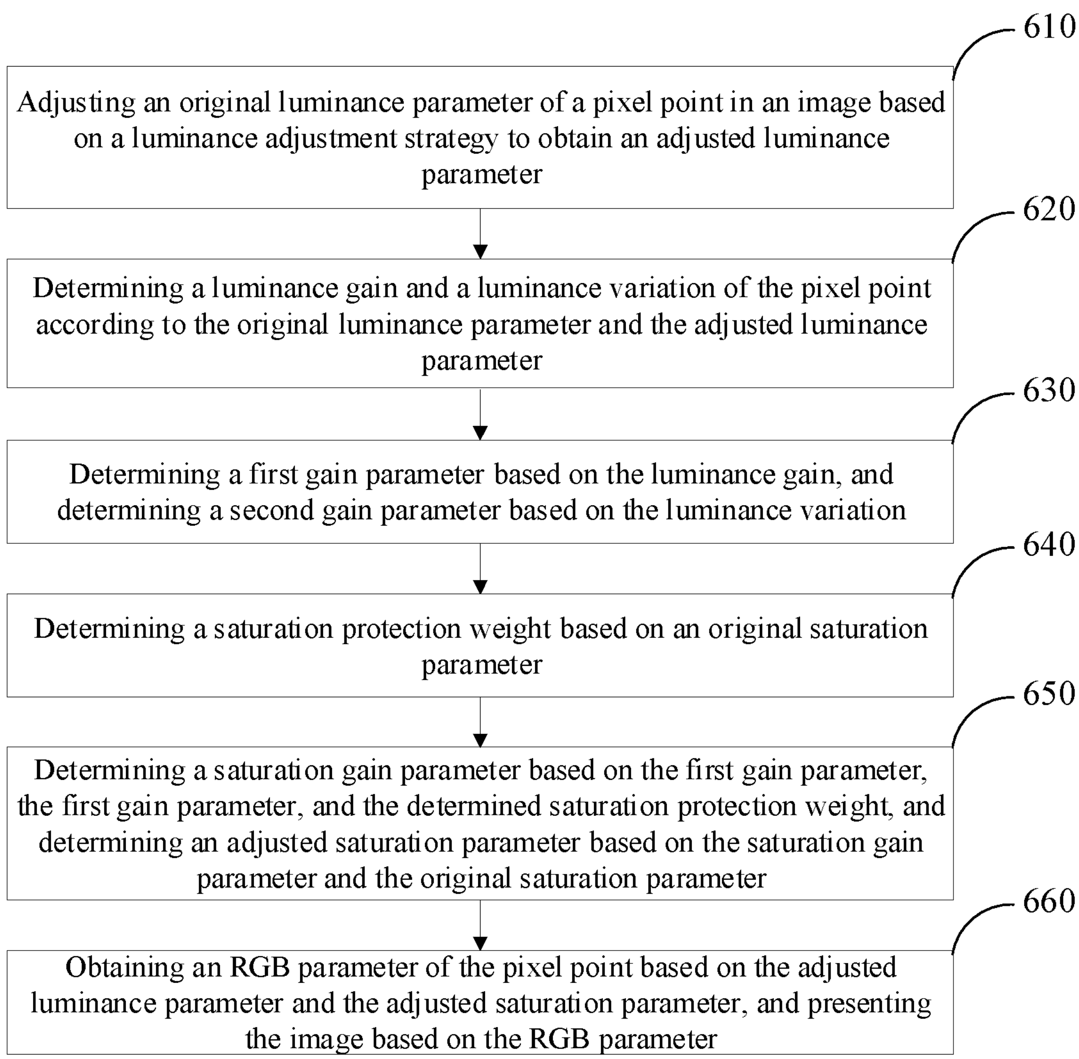
FIG. 6 is a schematic flowchart of an image processing method according to another exemplary embodiment of the described techniques.

FIG. 6 is a schematic flowchart of an image processing method according to another exemplary embodiment of the described techniques. The embodiment of FIG. 6 is an example of the embodiment of FIG. 2, and the similarities are not repeated to avoid repetition. As shown in FIG. 6, the image processing method includes the following content.

Step 610: adjusting an original luminance parameter of a pixel point in an image based on a luminance adjustment strategy to obtain an adjusted luminance parameter.

Step 620: determining a luminance gain and a luminance variation of the pixel point according to the original luminance parameter and the adjusted luminance parameter.

The luminance gain is a ratio of the adjusted luminance parameter to the original luminance parameter, and the luminance variation is a difference between the adjusted luminance parameter and the original luminance parameter.

Step 630: determining a first gain parameter based on the luminance gain, and determining a second gain parameter based on the luminance variation.

The first gain parameter is equal to the luminance gain when the luminance gain is greater than or equal to the first threshold, and the first gain parameter is a first constant when the luminance gain is less than the first threshold. The second gain parameter is a second constant when the luminance variation is greater than or equal to the second threshold, and the second gain parameter increases with a increase of the luminance variation when the luminance variation is greater than or equal to 0 and less than the second threshold.

Step 640: determining a saturation protection weight based on an original saturation parameter.

For example, a saturation value may be determined based on the original saturation parameter, and the saturation protection weight is determined based on the above formula (6). The saturation protection weight is configured to correct a saturation gain parameter.

Step 650: determining a saturation gain parameter based on the first gain parameter, the first gain parameter, and the determined saturation protection weight, and determining an adjusted saturation parameter based on the saturation gain parameter and the original saturation parameter.

Specifically, the saturation gain parameter may be determined based on the above formula (5), and the adjusted saturation parameter is determined based on the above formulas (2a) and (2b), or the adjusted saturation parameter is determined based on the formula (2c).

Step 660: obtaining an RGB parameter of the pixel point based on the adjusted luminance parameter and the adjusted saturation parameter, and presenting the image based on the RGB parameter.

Specifically, the RGB parameter may be determined based on the method according to the embodiment of FIG. 5 when the adjusted saturation parameter point exceeds a valid representation range of an RGB color space; and the RGB parameter may be determined based on a known conversion rule when the adjusted saturation parameter point does not exceed the valid representation range of the RGB color space.

Step 640 in this embodiment of the described techniques may be performed before any step before step 650, that is, step 640 and steps 610-630 may not interfere with each other. According to the image processing method provided by the embodiments of the described techniques, a saturation of the pixel point may be reasonably adjusted while luminance of the pixel point is adjusted, so that an image display effect after image processing may be improved, and an image quality is improved. In addition, when a YCrCb (or YUV) parameter is converted into the RGB parameter, for the YCrCb (or YUV) parameter exceeding an RGB parameter range, the YCrCb (or YUV) parameter may be converted into a valid RGB parameter by using a constant luminance and constant hue manner, so that detail information of the saturation parameter may be fully utilized, and color difference is effectively reduced.

Figure 7:
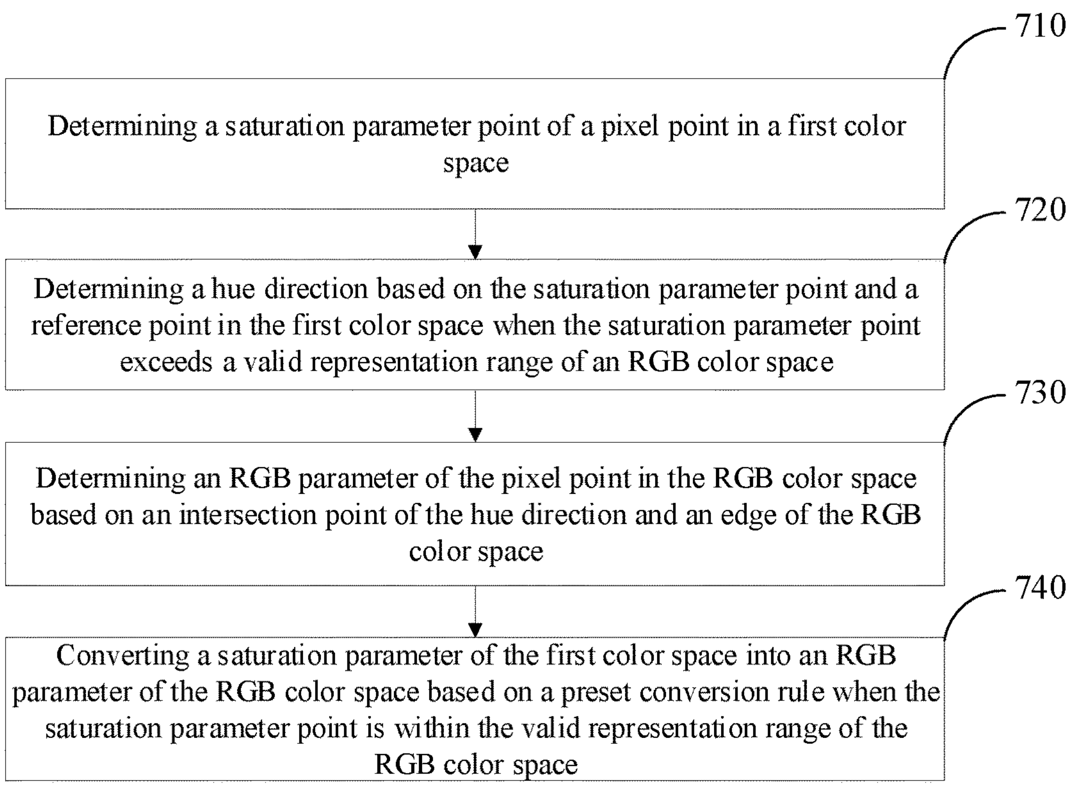
FIG. 7 is a schematic flowchart of an image processing method according to another exemplary embodiment of the described techniques.

FIG. 7 is a schematic flowchart of an image processing method according to another exemplary embodiment of the described techniques. For the related content in the embodiment of FIG. 7, reference may be made to the description of the embodiment of FIG. 2 or FIG. 6, and the similarities are not repeated to avoid repetition. The method of FIG. 7 may be performed by a computing device (for example, the computing device 110 in FIG. 1). As shown in FIG. 7, the image processing method includes the following content.

Step 710: determining a saturation parameter point of a pixel point in a first color space.

The first color space may be a YCrCb or YUV color space. The saturation parameter point of the pixel point in the first color space may be determined based on a YCrCb parameter (or YUV parameter) of the pixel point.

Specifically, a luminance parameter and a saturation parameter (such as CrCb, or UV) of the pixel point are known, and the saturation parameter point of the pixel point in the first color space may be determined based on the luminance parameter and the saturation parameter of the pixel point. Taking the YCrCb color space as an example, the luminance parameter may be used as a constant luminance, that is, Y is fixed, so that a determined two-dimensional CrCb space may be obtained, as shown in FIG. 5.

Step 720: determining a hue direction based on the saturation parameter point and a reference point in the first color space when the saturation parameter point exceeds a valid representation range of an RGB color space.

When the saturation parameter point exceeds the valid representation range of the RGB color space, a certain point in the two-dimensional CrCb space where the saturation parameter point is located may be selected as a reference point, for example, a point with coordinates (128, 128), and an RGB value corresponding to the point is (0, 0, 0). A direction extending outward from the reference point is a constant hue direction.

Step 730: determining an RGB parameter of the pixel point in the RGB color space based on an intersection point of the hue direction and an edge of the RGB color space.

As shown in FIG. 5, a connecting line is obtained when the point 1 is connected to the reference point, the connecting line represents a constant hue direction, an intersection point of the connecting line and the edge of the RGB color space is a point 4, and the RGB parameter corresponding to the point 4 may be used as the RGB parameter converted from the point 1. Similarly, another connecting line is obtained when the point 2 is connected to the reference point, the another connecting line represents another constant hue direction, an intersection point of the another connecting line and the edge of the RGB color space is a point 5, and the RGB parameter corresponding to the point 5 may be used as the RGB parameter converted from the point 2.

Step 740: converting a saturation parameter of the first color space into an RGB parameter of the RGB color space based on a preset conversion rule when the saturation parameter point is within the valid representation range of the RGB color space.

In the embodiments of the described techniques, when a YCrCb (or YUV) parameter is converted into the RGB parameter, for the YCrCb (or YUV) parameter exceeding an RGB parameter range, the YCrCb (or YUV) parameter may be converted into a valid RGB parameter by using a constant luminance and constant hue manner, so that detail information of the saturation parameter may be fully utilized, and color difference is effectively reduced.

Exemplary Apparatus

Figure 8:
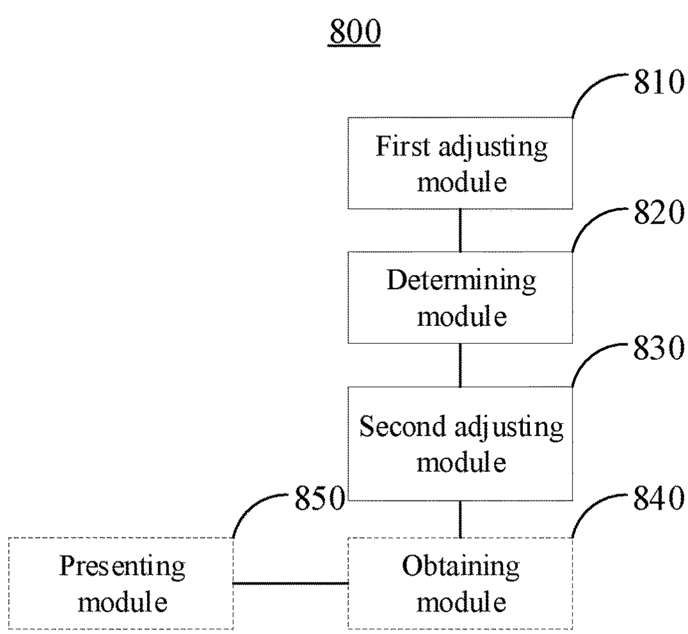
FIG. 8 is a schematic structural diagram of an image processing apparatus according to an exemplary embodiment of the described techniques.

FIG. 8 is a schematic structural diagram of an image processing apparatus 800 according to an exemplary embodiment of the described techniques. As shown in FIG. 8, the image processing apparatus 800 includes a first adjusting module 810, a determining module 820, and a second adjusting module 830.

The first adjusting module 810 is configured to adjust an original luminance parameter of a pixel point in an image based on a luminance adjustment strategy to obtain an adjusted luminance parameter; the determining module 820 is configured to determine a luminance change parameter of the pixel point according to the original luminance parameter and the adjusted luminance parameter, where the luminance change parameter is configured to represent a changing degree of the adjusted luminance parameter relative to the original luminance parameter; and the second adjusting module 830 is configured to adjust an original saturation parameter of the pixel point based on the luminance change parameter to obtain an adjusted saturation parameter, so as to compensate for a saturation of the pixel point.

According to the image processing apparatus provided in the embodiments of the described techniques, the saturation of the pixel point may be compensated by adjusting the original saturation parameter of the pixel point according to the luminance change parameter of the pixel point, so that the saturation of the pixel point is adaptively adjusted while adjusting the luminance of the pixel point, so as to improve perception of human eye on the saturation of the image, and thus the image quality may be improved, and a good display effect may be obtained.

According to an embodiment of the described techniques, the second adjusting module 830 is configured to: determine a saturation gain parameter based on the luminance change parameter; and determine the adjusted saturation parameter based on the saturation gain parameter and the original saturation parameter.

According to an embodiment of the described techniques, the luminance change parameter includes a luminance gain and a luminance variation, the luminance gain is a ratio of the adjusted luminance parameter to the original luminance parameter, the luminance variation is a difference between the adjusted luminance parameter and the original luminance parameter, and the second adjusting module 830 is configured to: determine a first gain parameter based on the luminance gain, where the first gain parameter is equal to the luminance gain when the luminance gain is greater than or equal to a first threshold, and the first gain parameter is a first constant when the luminance gain is less than the first threshold; determine a second gain parameter based on the luminance variation, where the second gain parameter is a second constant when the luminance variation is greater than or equal to a second threshold, and the second gain parameter increases with an increase of the luminance variation when the luminance variation is greater than or equal to 0 and less than the second threshold; and determine the saturation gain parameter based on the first gain parameter and the second gain parameter.

According to an embodiment of the described techniques, the determining module 820 is further configured to: determine a saturation protection weight based on the original saturation parameter. The second adjusting module 830 is configured to: determine the saturation gain parameter based on the first gain parameter, the second gain parameter, and the saturation protection weight according to the following formula: $Gain=(gain1*gain2-1)*Sgain+1$, where Gain is the saturation gain parameter, gain1 is the first gain parameter, gain2 is the second gain parameter, Sgain is the saturation protection weight, and the saturation protection weight is configured to correct the first gain parameter and the second gain parameter.

According to an embodiment of the described techniques, the determining module 820 is configured to: determine an original saturation value based on the original saturation parameter; determine that the saturation protection weight is equal to 1 when the original saturation value is greater than a third threshold; determine the saturation protection weight based on a preset coefficient and the original saturation value when the original saturation value is less than or equal to the third threshold and greater than or equal to a fourth threshold, where the fourth threshold is less than the third threshold, and the saturation protection weight is less than or equal to 1; and determine that the saturation protection weight is equal to 0 when the original saturation value is less than the fourth threshold.

According to an embodiment of the described techniques, the determining module 820 is configured to: determine an original saturation value based on the original saturation parameter, and determine the saturation protection weight based on the original saturation value, where the original saturation value is determined according to any of the following formulas: $S=(|Cb-128|+|Cr-128|)/2, S=||Cb-128|-|Cr-128||$, where S is the original saturation value, and Cr and Cb are the original saturation parameter.

According to an embodiment of the described techniques, the determining module 820 is further configured to: determine a saturation protection weight based on the original saturation parameter. The second adjusting module 830 is configured to: determine a saturation gain parameter based on the luminance change parameter; and determine the adjusted saturation parameter based on the saturation gain parameter, the saturation protection weight, and the original saturation parameter, where the saturation protection weight is configured to correct the saturation gain parameter.

According to an embodiment of the described techniques, the image processing apparatus 800 further includes: an obtaining module 840, configured to obtain an RGB parameter of the pixel point based on the adjusted luminance parameter and the adjusted saturation parameter; and a presenting module 850, configured to present the image based on the RGB parameter.

According to an embodiment of the described techniques, the obtaining module 840 is configured to: determine a saturation parameter point of the pixel point in a current color space based on the adjusted luminance parameter and the adjusted saturation parameter, where the current color space is a luminance-chroma color space; determine a hue direction based on the saturation parameter point and a reference point in the current color space when the saturation parameter point exceeds a valid representation range of an RGB color space; determine the RGB parameter of the pixel point in the RGB color space based on an intersection point of the hue direction and an edge of the RGB color space; and convert a saturation parameter of the current color space into the RGB parameter of the RGB color space based on a preset conversion rule when the saturation parameter point is within the valid representation range of the RGB color space.

According to an embodiment of the described techniques, the luminance change parameter includes at least one of a luminance gain and a luminance variation, the luminance gain is a ratio of the adjusted luminance parameter to the original luminance parameter, and the luminance variation is a difference between the adjusted luminance parameter and the original luminance parameter.

It should be understood that operations and functions of the first adjusting module 810, the determining module 820, the second adjusting module 830, the obtaining module 840, and the presenting module 850 in the foregoing embodiments may refer to the description in the image processing method provided in the embodiment of FIG. 2 or FIG. 6, and are not described herein again in order to avoid repetition.

Figure 9:
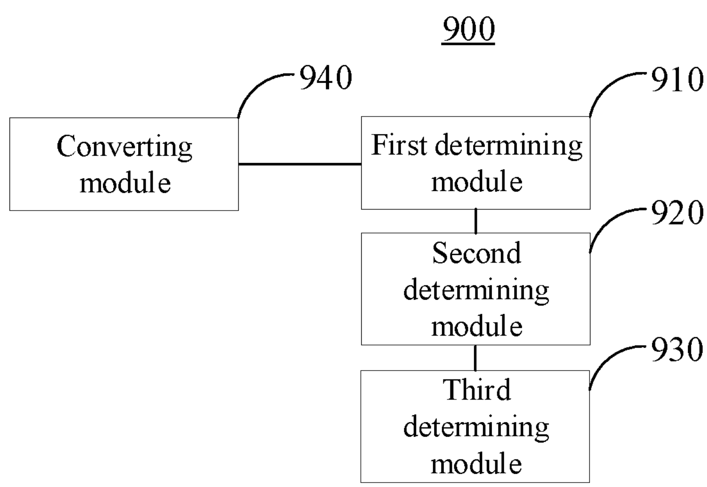
FIG. 9 is a schematic structural diagram of an image processing apparatus according to another exemplary embodiment of described techniques.

FIG. 9 is a schematic structural diagram of an image processing apparatus 900 according to another exemplary embodiment of the described techniques. As shown in FIG. 9, the image processing apparatus 900 includes a first determining module 910, a second determining module 920, a third determining module 930, and a converting module 940.

The first determining module 910 is configured to determine a saturation parameter point of a pixel point in a first color space, where the first color space is a luminance-chroma color space; the second determining module 920 is configured to determine a hue direction based on the saturation parameter point and a reference point in the first color space when the saturation parameter point exceeds a valid representation range of an RGB color space; the third determining module 930 is configured to determine an RGB parameter of the pixel point in the RGB color space based on an intersection point of the hue direction and an edge of the RGB color space; and the converting module 940 is configured to convert a saturation parameter of the first color space into an RGB parameter of the RGB color space based on a preset conversion rule when the saturation parameter point is within the valid representation range of the RGB color space.

According to the image processing apparatus provided in the embodiments of the described techniques, when a YCrCb (or YUV) parameter is converted into the RGB parameter, for the YCrCb (or YUV) parameter exceeding an RGB parameter range, the YCrCb (or YUV) parameter may be converted into a valid RGB parameter by using a constant luminance and constant hue manner, so that detail information of the saturation parameter may be fully utilized, and color difference is effectively reduced.

It should be understood that operations and functions of the first determining module 910, the second determining module 920, and the third determining module 930 in the foregoing embodiments may refer to the description in the image processing method provided in embodiment of FIG. 7, and are not described herein again in order to avoid repetition.

Figure 10:
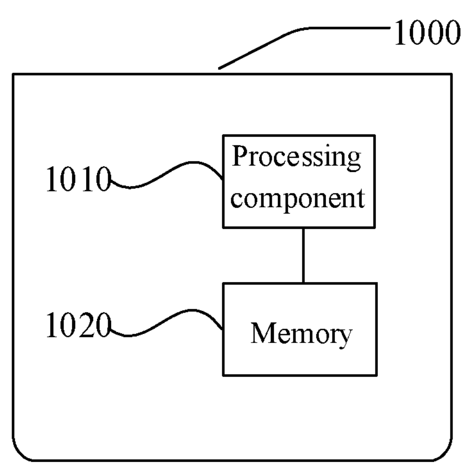
FIG. 10 is a block diagram of an electronic device for performing an image processing method according to an exemplary embodiment of the described techniques.

FIG. 10 is a block diagram of an electronic device 1000 for performing an image processing method according to an exemplary embodiment of the described techniques.

Referring to FIG. 10, the electronic device 1000 includes: a processing component 1010, where the processing component 1010 further includes one or more processors; and memory resources represented by a memory 1020 for storing instructions executable by the processing component 1010, such as an application program. The application program stored in the memory 1020 may include one or more modules each corresponding to a set of instructions. In addition, the processing component 1010 is configured to execute an instruction to execute the foregoing image processing method.

The electronic device 1000 may further include a power supply component configured to perform power management of the electronic device 1000, a wired or wireless network interface configured to connect the electronic device 1000 to a network, and an input/output (I/O) interface. The electronic device 1000 may be operated based on an operating system stored in the memory 1020, such as Windows Server™, Mac OS X™, Unix™, and FreeBSD™.

A non-transitory computer-readable storage medium is provided, and the image processing method may be performed by the electronic device 1000 when instructions in the storage medium are executed by the processor of the electronic device 1000.

All optional technical solutions above may be used in any combination to form an optional embodiment of the described techniques, and details are not described herein again.

A person of ordinary skill in the art may be aware that, units and algorithm steps in examples described in combination with the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each specific application, but it should not be considered that the implementation goes beyond the scope of the described techniques.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the described techniques, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate components may be or may not be physically separated, and the components displayed as units may or may not be physical units, that is, may be located in one position, or may be distributed on a plurality of network units. A part or all of the units may be selected according to actual needs to achieve the objective of the solutions of the embodiments.

In addition, function units in the embodiments of the described techniques may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of the described techniques, which is essential or a part contributing to the prior art or a part, of the technical solution, may be embodied in the form of a software product. The computer software product is stored in a storage medium and includes several instructions for enabling a computer device (which may be a personal computer, a server, a network device, or the like) to perform all or a part of the steps of the methods described in the embodiments of the described techniques. The foregoing storage medium includes: various media that may store program check codes, such as a USB flash disk, a mobile hard disk, a Read-Only Memory (ROM), a Random Access Memory (RAM), a magnetic disk, or an optical disk.

It should be noted that in the specification, the terms "first", "second", "third", and the like are merely intended for the purpose of description, and shall not be understood as an indication or implication of relative importance. In addition, in the descriptions of the described techniques, unless otherwise stated, "a plurality of" means at least two.

The foregoing descriptions are merely preferred embodiments of the described techniques, and are not intended to limit the scope of the techniques described in this document, and any modification, equivalent replacement, etc., made within the spirit and principles of the described techniques should be included within the scope of the document.

What is claimed is:

1. A method performed by an image processing device, the method comprising:

adjusting an original luminance parameter of a pixel point in an image based on a luminance adjustment strategy to obtain an adjusted luminance parameter;

determining a luminance change parameter of the pixel point according to the original luminance parameter and the adjusted luminance parameter, wherein the luminance change parameter is configured to represent a changing degree of the adjusted luminance parameter relative to the original luminance parameter; and adjusting an original saturation parameter of the pixel point based on the luminance change parameter to obtain an adjusted saturation parameter, so as to compensate for a saturation of the pixel point, wherein adjusting the original saturation parameter of the pixel point to obtain the adjusted saturation parameter comprises:

determining a saturation protection weight based on the original saturation parameter, determining a saturation gain parameter based on the luminance change parameter; and determining the adjusted saturation parameter based on the saturation gain parameter, the saturation protection weight, and the original saturation parameter, wherein the saturation protection weight is configured to correct the saturation gain parameter.

2. The method according to claim 1, wherein the luminance change parameter comprises a luminance gain and a luminance variation, wherein the luminance gain is a ratio of the adjusted luminance parameter to the original luminance parameter, wherein the luminance variation is a difference between the adjusted luminance parameter and the original luminance parameter, and wherein determining the saturation gain parameter based on the luminance change parameter comprises:

determining a first gain parameter based on the luminance gain, wherein the first gain parameter is equal to the luminance gain when the luminance gain is greater than or equal to a first threshold, and the first gain parameter is a first constant when the luminance gain is less than the first threshold;

determining a second gain parameter based on the luminance variation, wherein the second gain parameter is a second constant when the luminance variation is greater than or equal to a second threshold, and the second gain parameter increases with an increase of the luminance variation when the luminance variation is greater than or equal to 0 and less than the second threshold; and determining the saturation gain parameter based on the first gain parameter and the second gain parameter.

3. The method according to claim 2, wherein determining the saturation gain parameter based on the first gain parameter and the second gain parameter comprises:

determining the saturation gain parameter based on the first gain parameter, the second gain parameter, and the saturation protection weight according to the following formula:

$$Gain = (gain1 * gain2 - 1) * Sgain + 1,$$

wherein the term "*Gain*" is the saturation gain parameter, the term "gain1" is the first gain parameter, the term "gain2" is the second gain parameter, and the term "Sgain" is the saturation protection weight configured to correct the first gain parameter and the second gain parameter.

4. The method according to claim 3, wherein determining the saturation protection weight based on the original saturation parameter comprises:

determining an original saturation value based on the original saturation parameter;

determining that the saturation protection weight is equal to 1 when the original saturation value is greater than a third threshold;

determining the saturation protection weight based on a preset coefficient and the original saturation value when the original saturation value is less than or equal to the third threshold and greater than or equal to a fourth threshold, wherein the fourth threshold is less than the third threshold, and the saturation protection weight is less than or equal to 1; and determining that the saturation protection weight is equal to 0 when the original saturation value is less than the fourth threshold.

5. The method according to claim 3, wherein determining the saturation protection weight based on the original saturation parameter comprises:

determining an original saturation value based on the original saturation parameter, and determining the saturation protection weight based on the original saturation value, wherein the original saturation value is determined according to $$S = \frac{|Cb - 128| + |Cr - 128|}{2},$$

or $$S = ||Cb - 128| - |Cr - 128||,$$

wherein the term "S" is the original saturation value, and the term "Cr" and the term "Cb" are the original saturation parameter.

6. The method according to claim 1, further comprising:

obtaining an RGB parameter of the pixel point based on the adjusted luminance parameter and the adjusted saturation parameter; and presenting the image based on the RGB parameter.

7. The method according to claim 6, wherein obtaining the RGB parameter of the pixel point based on the adjusted luminance parameter and the adjusted saturation parameter comprises:

determining a saturation parameter point of the pixel point in a current color space based on the adjusted luminance parameter and the adjusted saturation parameter, wherein the current color space is a luminance-chroma color space;

determining a hue direction based on the saturation parameter point and a reference point in the current color space when the saturation parameter point exceeds a valid representation range of an RGB color space;

determining the RGB parameter of the pixel point in the RGB color space based on an intersection point of the hue direction and an edge of the RGB color space; and converting a saturation parameter of the current color space into the RGB parameter of the RGB color space based on a preset conversion rule when the saturation parameter point is within the valid representation range of the RGB color space.

8. The method according to claim 1, wherein the luminance change parameter comprises at least one of a luminance gain and a luminance variation, the luminance gain is a ratio of the adjusted luminance parameter to the original luminance parameter, and the luminance variation is a difference between the adjusted luminance parameter and the original luminance parameter.

9. An electronic device, comprising:

a processor; and a memory configured to store instructions that when executed by the processor cause the processor to perform operations, the operations comprising:

adjusting an original luminance parameter of a pixel point in an image based on a luminance adjustment strategy to obtain an adjusted luminance parameter;

determining a luminance change parameter of the pixel point according to the original luminance parameter and the adjusted luminance parameter, wherein the luminance change parameter is configured to represent a changing degree of the adjusted luminance parameter relative to the original luminance parameter; and adjusting an original saturation parameter of the pixel point based on the luminance change parameter to obtain an adjusted saturation parameter, so as to compensate for a saturation of the pixel point, wherein adjusting the original saturation parameter of the pixel point to obtain the adjusted saturation parameter comprises:

determining a saturation protection weight based on the original saturation parameter, determining a saturation gain parameter based on the luminance change parameter; and determining the adjusted saturation parameter based on the saturation gain parameter, the saturation protection weight, and the original saturation parameter, wherein the saturation protection weight is configured to correct the saturation gain parameter.

10. The electronic device according to claim 9, wherein the luminance change parameter comprises a luminance gain and a luminance variation, wherein the luminance gain is a ratio of the adjusted luminance parameter to the original luminance parameter, wherein the luminance variation is a difference between the adjusted luminance parameter and the original luminance parameter, and wherein determining the saturation gain parameter based on the luminance change parameter comprises:

determining a first gain parameter based on the luminance gain, wherein the first gain parameter is equal to the luminance gain when the luminance gain is greater than or equal to a first threshold, and the first gain parameter is a first constant when the luminance gain is less than the first threshold;

determining a second gain parameter based on the luminance variation, wherein the second gain parameter is a second constant when the luminance variation is greater than or equal to a second threshold, and the second gain parameter increases with an increase of the luminance variation when the luminance variation is greater than or equal to 0 and less than the second threshold; and determining the saturation gain parameter based on the first gain parameter and the second gain parameter.

11. The electronic device according to claim 10, wherein determining the saturation gain parameter based on the first gain parameter and the second gain parameter comprises:

determining the saturation gain parameter based on the first gain parameter, the second gain parameter, and the saturation protection weight according to the following formula:

$$Gain = (gain1 * gain2 - 1) * Sgain + 1,$$

wherein the term "Gain" is the saturation gain parameter, the term "gain1" is the first gain parameter, the term "gain2" is the second gain parameter, and the term "Sgain" is the saturation protection weight configured to correct the first gain parameter and the second gain parameter.

12. The electronic device according to claim 11, wherein determining the saturation protection weight based on the original saturation parameter comprises:

determining an original saturation value based on the original saturation parameter;

determining that the saturation protection weight is equal to 1 when the original saturation value is greater than a third threshold;

determining the saturation protection weight based on a preset coefficient and the original saturation value when the original saturation value is less than or equal to the third threshold and greater than or equal to a fourth threshold, wherein the fourth threshold is less than the third threshold, and the saturation protection weight is less than or equal to 1; and determining that the saturation protection weight is equal to 0 when the original saturation value is less than the fourth threshold.

13. The electronic device according to claim 9, wherein the operations further comprise:

obtaining an RGB parameter of the pixel point based on the adjusted luminance parameter and the adjusted saturation parameter; and presenting the image based on the RGB parameter.

14. The electronic device according to claim 13, wherein obtaining the RGB parameter of the pixel point based on the adjusted luminance parameter and the adjusted saturation parameter comprises:

determining a saturation parameter point of the pixel point in a current color space based on the adjusted luminance parameter and the adjusted saturation parameter, wherein the current color space is a luminance-chroma color space;

determining a hue direction based on the saturation parameter point and a reference point in the current color space when the saturation parameter point exceeds a valid representation range of an RGB color space;

determining the RGB parameter of the pixel point in the RGB color space based on an intersection point of the hue direction and an edge of the RGB color space; and converting a saturation parameter of the current color space into the RGB parameter of the RGB color space based on a preset conversion rule when the saturation parameter point is within the valid representation range of the RGB color space.

15. One or more non-transitory computer-readable storage media storing instructions that when executed by one or more computers cause the one or more computers to perform operations, the operations comprising:

adjusting an original luminance parameter of a pixel point in an image based on a luminance adjustment strategy to obtain an adjusted luminance parameter;

determining a luminance change parameter of the pixel point according to the original luminance parameter and the adjusted luminance parameter, wherein the luminance change parameter is configured to represent a changing degree of the adjusted luminance parameter relative to the original luminance parameter; and adjusting an original saturation parameter of the pixel point based on the luminance change parameter to obtain an adjusted saturation parameter, so as to compensate for a saturation of the pixel point, wherein adjusting the original saturation parameter of the pixel point to obtain the adjusted saturation parameter comprises:

determining a saturation protection weight based on the original saturation parameter, determining a saturation gain parameter based on the luminance change parameter; and determining the adjusted saturation parameter based on the saturation gain parameter, the saturation protection weight, and the original saturation parameter, wherein the saturation protection weight is configured to correct the saturation gain parameter.

16. The one or more computer-readable storage media according to claim 15, wherein the luminance change parameter comprises a luminance gain and a luminance variation, wherein the luminance gain is a ratio of the adjusted luminance parameter to the original luminance parameter, wherein the luminance variation is a difference between the adjusted luminance parameter and the original luminance parameter, and wherein determining the saturation gain parameter based on the luminance change parameter comprises:

determining a first gain parameter based on the luminance gain, wherein the first gain parameter is equal to the luminance gain when the luminance gain is greater than or equal to a first threshold, and the first gain parameter is a first constant when the luminance gain is less than the first threshold;

determining a second gain parameter based on the luminance variation, wherein the second gain parameter is a second constant when the luminance variation is greater than or equal to a second threshold, and the second gain parameter increases with an increase of the luminance variation when the luminance variation is greater than or equal to 0 and less than the second threshold; and determining the saturation gain parameter based on the first gain parameter and the second gain parameter.

17. The one or more computer-readable storage media according to claim 16, wherein determining the saturation gain parameter based on the first gain parameter and the second gain parameter comprises:

determining the saturation gain parameter based on the first gain parameter, the second gain parameter, and the saturation protection weight according to the following formula:

$$Gain = (gain1 * gain2 - 1) * Sgain + 1,$$

wherein the term "Gain" is the saturation gain parameter, the term "gain1" is the first gain parameter, the term "gain2" is the second gain parameter, and the term "Sgain" is the saturation protection weight configured to correct the first gain parameter and the second gain parameter.

18. The one or more computer-readable storage media according to claim 17, wherein determining the saturation protection weight based on the original saturation parameter comprises:

determining an original saturation value based on the original saturation parameter;

determining that the saturation protection weight is equal to 1 when the original saturation value is greater than a third threshold;

determining the saturation protection weight based on a preset coefficient and the original saturation value when the original saturation value is less than or equal to the third threshold and greater than or equal to a fourth threshold, wherein the fourth threshold is less than the third threshold, and the saturation protection weight is less than or equal to 1; and determining that the saturation protection weight is equal to 0 when the original saturation value is less than the fourth threshold.

19. The one or more computer-readable storage media according to claim 15, wherein the operations further comprise:

obtaining an RGB parameter of the pixel point based on the adjusted luminance parameter and the adjusted saturation parameter; and presenting the image based on the RGB parameter.

20. The one or more computer-readable storage media according to claim 19, wherein obtaining the RGB parameter of the pixel point based on the adjusted luminance parameter and the adjusted saturation parameter comprises:

determining a saturation parameter point of the pixel point in a current color space based on the adjusted luminance parameter and the adjusted saturation parameter, wherein the current color space is a luminance-chroma color space;

determining a hue direction based on the saturation parameter point and a reference point in the current color space when the saturation parameter point exceeds a valid representation range of an RGB color space;

determining the RGB parameter of the pixel point in the RGB color space based on an intersection point of the hue direction and an edge of the RGB color space; and converting a saturation parameter of the current color space into the RGB parameter of the RGB color space based on a preset conversion rule when the saturation parameter point is within the valid representation range of the RGB color space.

* * * * *